(12) United States Patent
Stanitzok et al.

(10) Patent No.: US 7,614,768 B2
(45) Date of Patent: Nov. 10, 2009

(54) VEHICLE LIGHT

(75) Inventors: Ewald Stanitzok, Ennepetal (DE); Albrecht Haack, Wuppertal (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/666,469

(22) PCT Filed: Oct. 18, 2005

(86) PCT No.: PCT/EP2005/011200

§ 371 (c)(1),
(2), (4) Date: Aug. 9, 2007

(87) PCT Pub. No.: WO2006/045493

PCT Pub. Date: May 4, 2006

(65) Prior Publication Data

US 2008/0062710 A1    Mar. 13, 2008

(30) Foreign Application Priority Data

Oct. 28, 2004   (EP)   ................... 04025671

(51) Int. Cl.
*F21F 5/00* (2006.01)

(52) U.S. Cl. .................. 362/327; 362/511; 362/625

(58) Field of Classification Search ................ 362/327, 362/330, 503, 511, 602, 615, 616, 623, 625, 362/628
See application file for complete search history.

(56) References Cited

U.S. PATENT DOCUMENTS

| 5,197,792 | A  | * | 3/1993 | Jiao et al. | 362/623 |
| 5,434,754 | A  |   | 7/1995 | Li et al. | |
| 6,097,549 | A  | * | 8/2000 | Jenkins et al. | 362/517 |
| 6,193,383 | B1 | * | 2/2001 | Onikiri et al. | 362/327 |
| 2002/0071267 | A1 | | 6/2002 | Lekson et al. | |

FOREIGN PATENT DOCUMENTS

| DE | 20306739 | 8/2003 |
| EP | 0911574 | 4/1999 |
| FR | 2853392 | 10/2004 |
| WO | WO99/09349 | 2/1999 |

* cited by examiner

*Primary Examiner*—Y My Quach Lee
(74) *Attorney, Agent, or Firm*—Thomas N. Twomey

(57) ABSTRACT

A vehicle light has at least one light source and a light guide device into which light emitted by the light source can be directed and which possesses output means for outputting the light or a portion of the light. Diverting means are provided between the light source and the output means in such a way that widening and parallelization of the light takes place inside the light guide device. The diverting means comprise at lest one incision constructed on the light guide device which defines internal reflection surfaces for diverting the light laterally from a main beam direction of the at least one light source, and an end face of the light guide device that has external reflection surfaces that divert light already diverted laterally previously in the main beam direction of the at least one light source.

10 Claims, 3 Drawing Sheets

VEHICLE LIGHT

The invention relates to a vehicle light, in particular a brake light, having at least one light source.

Figure 1:
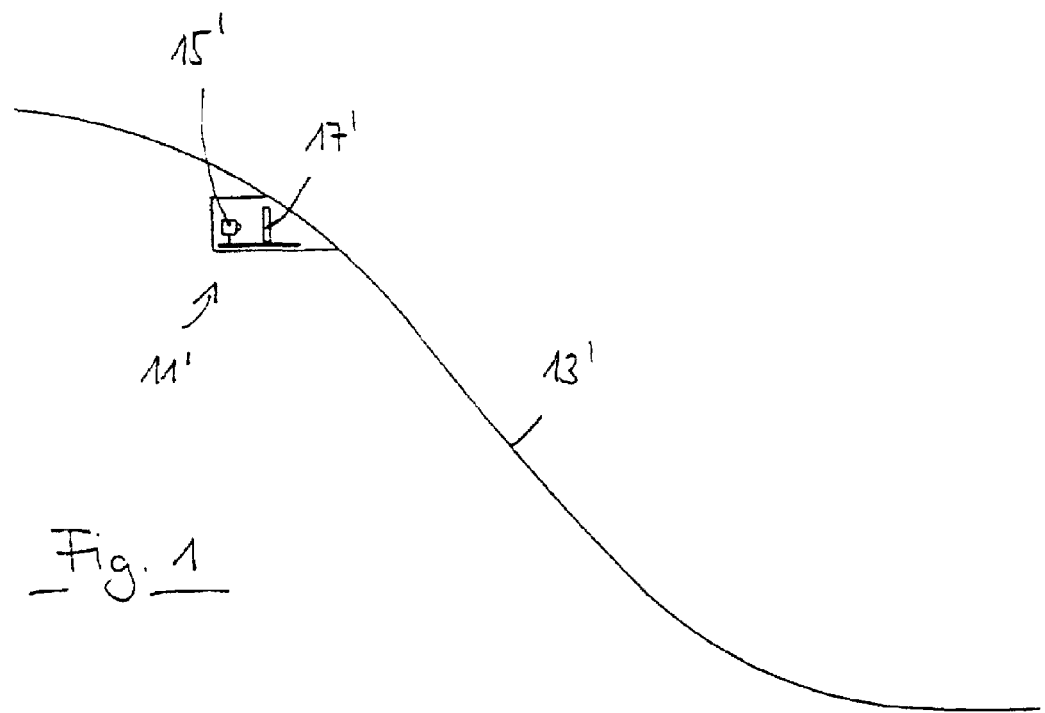

Such vehicle lights are known in many forms. For example such a vehicle light can be provided in motor vehicles as an additional, third brake light in the region of a parcel shelf or at another position on the rear window of a motor vehicle, i.e. as a brake light set at a high position with respect to the other brake lights. Such high-set brake lights usually have a plurality of light sources, preferably LEDs, arranged in a row each of which has a convergent lens, in particular a Fresnel lens, mounted in front as illustrated in FIG. 1. The light aligned by the Fresnel lens is then uniformly distributed by a diffusing disk so that the light emitted by the brake light has the direction and uniformity required by legislation.

To attain the desired beam characteristics of the light emitted by the brake light, however, it is necessary that the lenses be arranged at a certain distance from the light sources. This has the consequence, especially in the case of flat rear windows inclined, for example, at an angle of 20 to 45° to the horizontal, that the brake lights require a no longer negligible installation space, in particular installation depth, so that in certain circumstances the installation of other components has to be dispensed with.

It is an object of the invention to provide a vehicle light of the type identified at the outset that requires as small an installation space as possible for fitting to a rear window of a motor vehicle.

This task is solved by the characteristics of claim 1 and in particular in that a light guide device is provided into which the light emitted by the light source is directable and which possesses decoupling means for decoupling the light or a portion thereof, wherein diverting means are provided between the light source and the decoupling means in such a way that inside the light guide device the light is rendered divergent and parallel.

Consequently, in the vehicle light according to the invention the light emitted by at least one light source is directed into the light guide device in particular by input surfaces of the light guide device in which the light can be guided or steered under control. Moreover, the light guide device possesses output means by means of which the light or a portion thereof can be output again from the light guide device.

The vehicle light according to the invention is characterised in that between the light source or the plurality of light sources, which can be arranged in particular in a row, and the output means diverting means are provided, wherein by the term "between" is meant that with respect to the pathway or route of the light the diverting means are arranged between the light source(s) and the output means, i.e. a geometric arrangement of the diverting means between the light source (s) and the output means is not necessarily required.

At the same time the diverting means are constructed in such a way that in particular for every light source the light beam is made wider and parallel. This is advantageous because due to the active widening of the light a greater area is illuminated inside the light guide device than the angular area produced by the divergence of the light source in question. In an elongated vehicle light requiring a plurality of light sources for the complete illumination of the vehicle light along its longitudinal extension the mutual spacing of the light sources can consequently be increased so that for the vehicle light in question altogether fewer light sources are needed.

Furthermore, by parallelising the light it can be achieved that the beams of light each encounter the output means of the light guide device at the same angle which means are constructed, for example, in the form of one or more reflection surfaces so that the light can be output from the light guide device with a high degree of effectiveness. By the term parallelisation is meant that at least a large proportion of the light can be rendered parallel by the diverting means. The diverting surfaces can be constructed as planar or curved reflection surfaces.

Advantageous embodiments of the invention are specified in the subsidiary claims, the description and the drawing.

According to a preferred embodiment of the invention the light guide device has a basic plate-like form. Due to the plate-like basic shape of the light guide device the vehicle light as a whole can be kept particularly flat. Accordingly, the vehicle light is attachable in particularly space-saving manner to the rear window of a motor vehicle. Due to its small thickness, however, the vehicle light may alternatively be integrated into the rear window as a component of the latter.

It is also preferred for the diverting means to be constructed for multiple, in particular double, reflection of the light. By this means the light can be rendered divergent and parallelised in particularly simple manner.

Furthermore, it is proposed according to the invention that the diverting means comprise at least one incision constructed on the light guide device to define internal reflection surfaces for diverting the light. Due to the incision, constructed, for example, as a cut or notch inside the light guide device, boundary surfaces of the light guide device are produced relative to the medium, air for example, surrounding the light guide device so that internal reflection surfaces are produced on which the light is reflected, in particular by total reflection. The incision preferably extends all the way through the light guide device.

According to a particularly preferred embodiment of the invention a plurality of incisions, in particular three, are provided for each light source, these being arranged with mirror symmetry with respect to a central plane. In the case of a light source located in the central plane whose main beam direction runs parallel to the central plane a portion of the light can be diverted in one direction and the other portion of the light in a direction having mirror symmetry with respect to the central plane. Thus, the light emitted by the light source can be widened in mirror image symmetry.

It is particularly advantageous for a first incision arranged in the main beam direction of the light source to have front internal reflection surfaces through which light emitted substantially in the main beam direction of the light source is divertable laterally. An incision is arranged in the main beam direction of the light source when it is acted upon by light emitted in the main beam direction of the light source.

Furthermore, according to the invention a second and third incision each arranged outside the main beam direction of the light source can each have a front and/or a rear internal reflection surface, wherein due to the front internal reflection surfaces light, whose beam direction is inclined at an angle differing from zero to the main beam direction of the light source, is divertable laterally and/or light already diverted laterally previously by the rear internal reflection surfaces is divertable in the main beam direction of the light source. An incision is arranged outside the main beam direction of the light source when it is not acted upon by light emitted in the main beam direction of the light source.

According to another preferred embodiment of the invention an outer surface, in particular an end face, of the light guide device possesses external reflection surfaces for diverting the light which form part of the diverting means. In particular, due to the external reflection surfaces light already diverted laterally previously is divertable in the main beam direction of the light source. By this means parallelisation of light emitted outside the main beam direction of the light source can be achieved in particularly simple fashion.

The external reflection surfaces can be arranged in the manner of a cascade or steps and/or be offset relative to one another in the main beam direction of the light source so that divergent light, as usually emitted by a light source, is divertable over its entire angular range. Furthermore, the external reflection surfaces associated with each light source can be disposed with mirror image symmetry with respect to a central plane.

According to another development of the invention the diverting means are configured in such a way that the widening and parallelisation of the light ensues substantially in a plane. This is advantageous in particular when the light guide device has a substantially planar, in particular plate-like basic form.

A plurality of light sources can be arranged in a row running parallel to at least one reflection surface of the output means. This ensures that the light from all light sources is reflected from the reflection surface(s) of the output means at the same angle with respect to the latter so that in particular in the case of an elongated vehicle light a homogeneous beam characteristic is obtained.

Reflection surfaces for diverting the light, in particular internal reflection surfaces, external reflection surfaces and/or reflection surfaces of the output means are preferably constructed as part of prisms or facets or prism-like or facetted depressions.

A particularly space-saving construction of the vehicle light, which is provided in particular for attachment to a rear window of a motor vehicle, is obtained when the light guide device is simultaneously constructed in the form of a housing part, in particular half of a housing shell.

Figure 2:
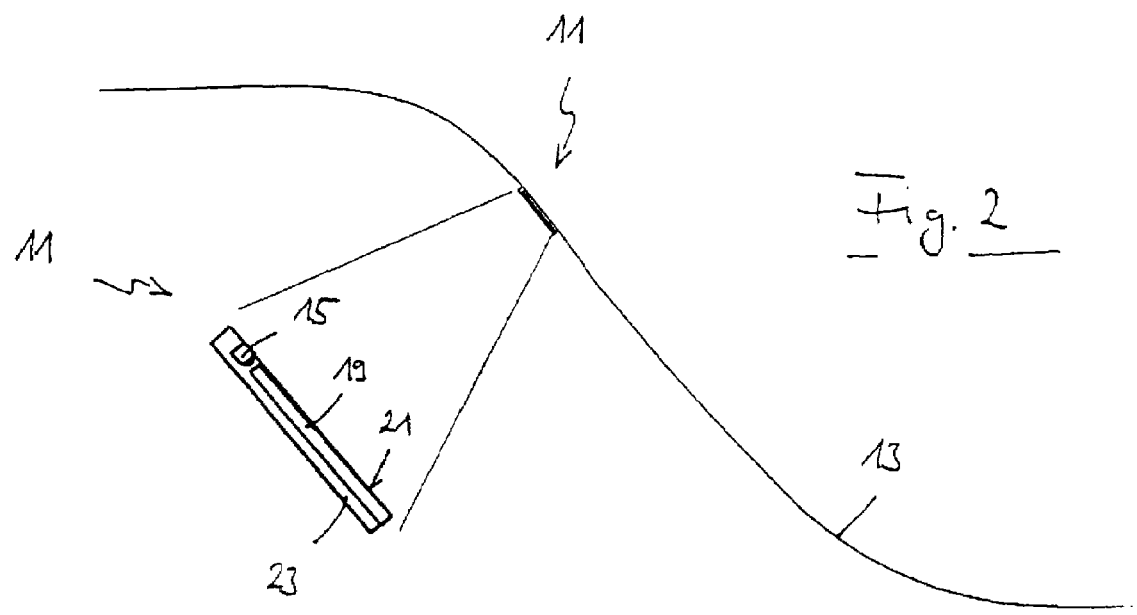
Figure 3A:
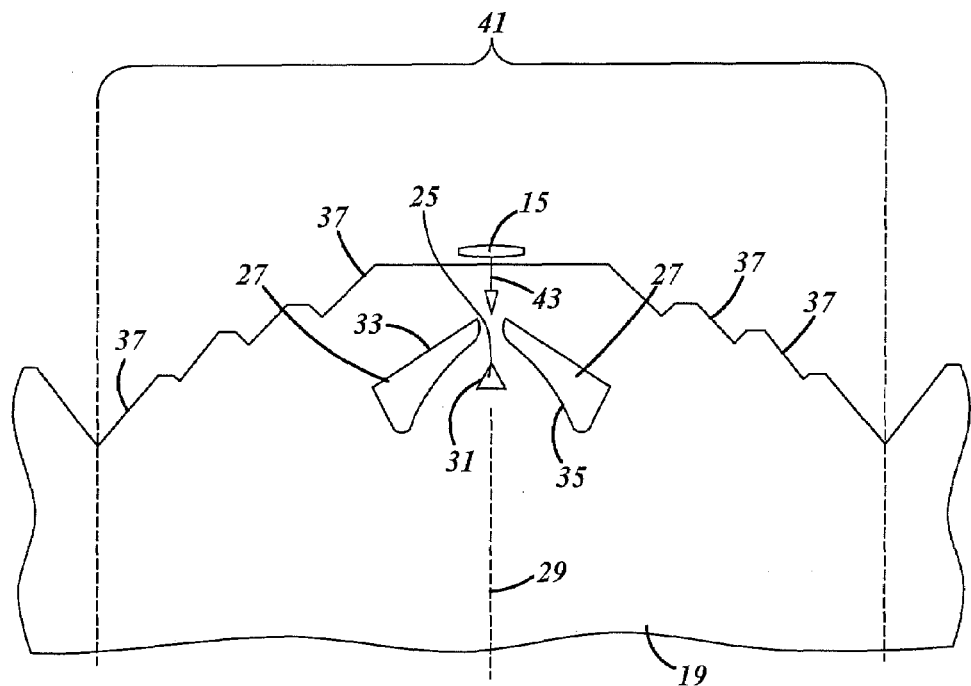
Figure 3B:
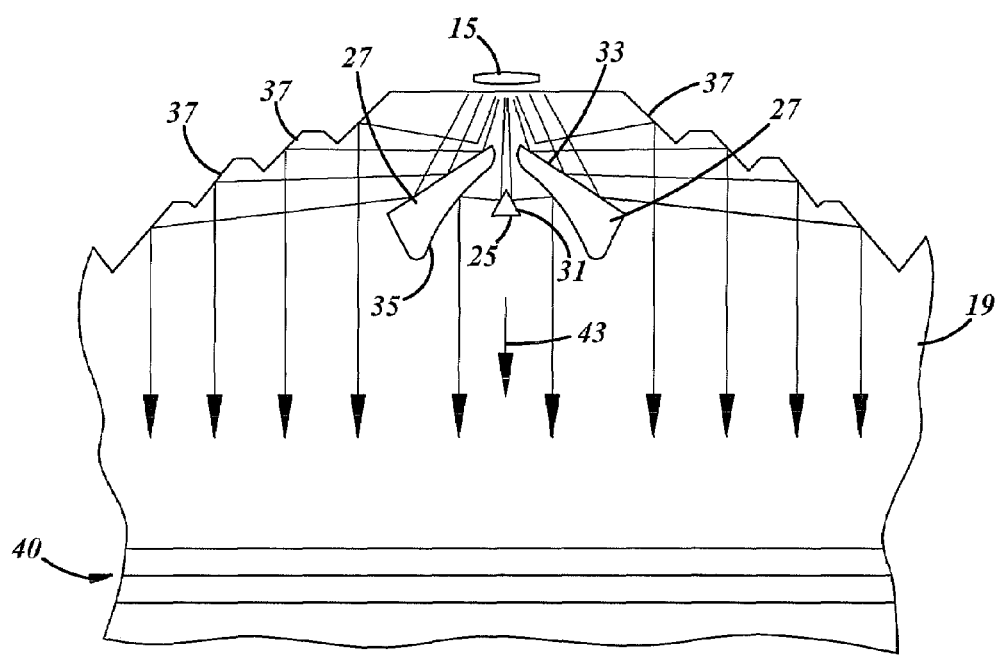
Figure 4A:
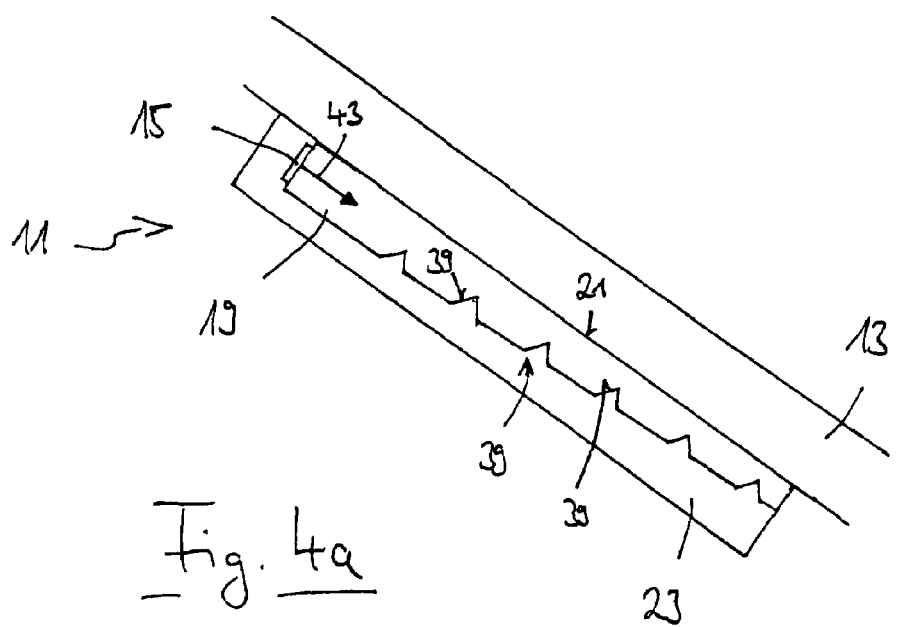
Figure 4B:
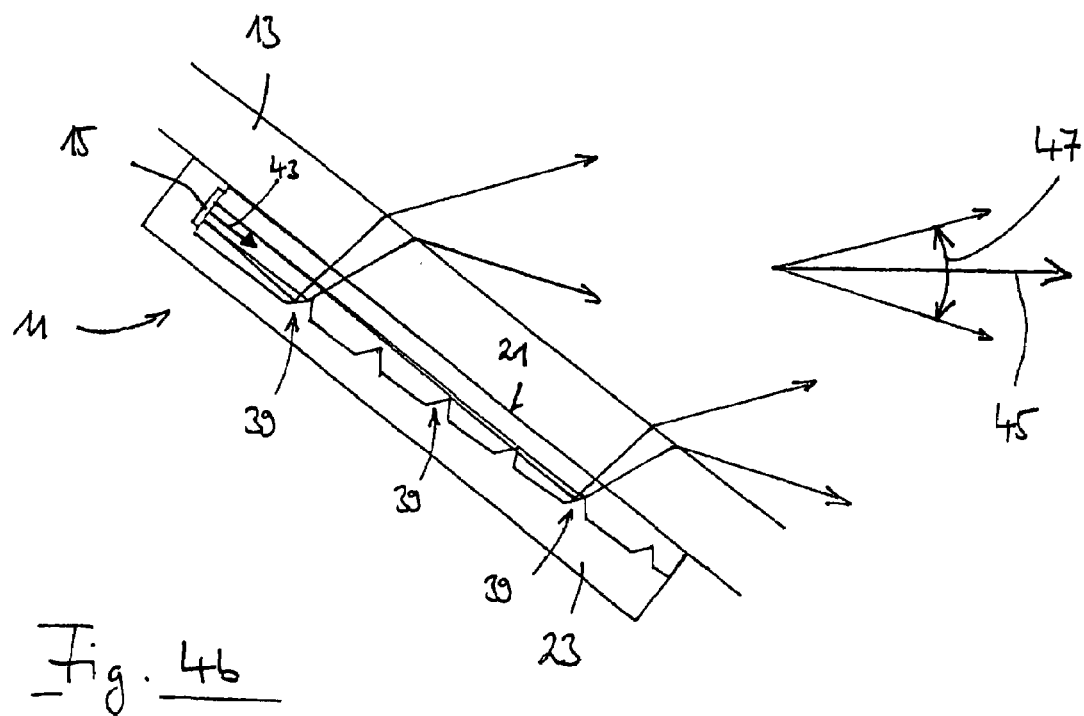

The invention is explained below by way of example with reference to the drawing. This shows:

FIG. 1 a side view of a brake light disclosed in the state of the art which is fitted to the rear window of a motor vehicle;

FIG. 2 a side view of a brake light according to the invention having a flat structural shape fitted to the rear window of a motor vehicle;

FIG. 3a a plan view onto a schematically illustrated light guide device according to the invention;

FIG. 3b the light guide device in FIG. 3a with light directed into the light guide device;

FIG. 4a a cross-section through a brake light according to the invention;

FIG. 4b the beam characteristics of the brake light according to the invention in the plane defined by the cross-section in FIG. 4a.

FIG. 1 shows a brake light 11' disclosed in the state of the art which is fitted to a schematically illustrated rear window 13' of a motor vehicle. The known brake light 11' comprises a plurality of LEDs 15' arranged in a row so that in the view selected for FIG. 1 only one LED 15' is discernible and for each LED 15' there is a Fresnel lens 17' arranged at a distance horizontally to the rear thereof. The known brake light 11' has a considerable installation depth so that the brake light 11' extends into the passenger space of the motor vehicle.

FIG. 2 shows a brake light 11 according to the invention fitted to the rear window 13 of a motor vehicle. According to the enlarged illustration of the brake light 11 according to the invention in FIG. 2 the brake light 11 according to the invention comprises a plurality of LEDs 15 which by analogy with FIG. 1 conceal one another and a light guide device 19 into which light emitted by the LEDs 15 can be directed. The brake light 11 according to the invention in the illustration is an elongated brake light 11 whose longitudinal extension is substantially determined by the number of LEDs 15 arranged alongside one another.

The light guide device 19 is of substantially plate-like construction, is designed with a flat side 21 through which the light from the light guide device 19 can be output and is fastened to the inside of the rear window 13. Accordingly, the light guide device 19 is simultaneously constructed as half of a housing shell which is combined with another half housing shell 23 composed of non-transparent plastic facing towards the passenger space to form a housing for the brake light 11, wherein in order to improve the light yield emitted by the brake light 11 a mirror film, which is not illustrated, is arranged between the light guide 19 and the other half shell of the housing 23.

FIG. 3a shows the light guide device 19 according to the invention in the region of a LED 15 chosen by way of example, wherein the regions of the light guide device 19 associated with the LEDs 15 are identical for different LEDs 15 as can be seen indicatively in FIG. 3a to the sides of the region 41. In the region 41 in the illustration the light guide device 19 has three incisions 25, 27 which are arranged with mirror symmetry with respect to a central plane 29. In this case the incisions 25, 27 extend all the way through the light guide device 19.

The boundary surfaces of the light guide device 19 formed by the incisions 25, 27 form internal reflection surfaces by which light directed by the LED 15 into the light guide device 19 can be diverted. The LED 15 is arranged in the central plane 29 and its main beam direction 43 runs parallel to the central plane 29. The incision 25 in this case is arranged in the main beam direction of the LED 15, while the incisions 27 are arranged outside the main beam direction of the LED 15.

The incision 25, which in the view illustrated in FIG. 3a is of substantially triangular construction, possesses two front internal reflection surfaces 31. The incisions 27 spaced apart from one another to allow the incision 25 to be acted upon by light emitted substantially in the main beam direction 43 of the LED 15 each possess a front internal reflection surface 33 and a rear internal reflection surface 35. The internal reflection surfaces 31, 33, 35 are each provided for diverting the light directed into the light guide device 19 as explained in more detail at another point in the text.

Furthermore, at its front end where the LED 15 is arranged in adjoining manner and directs light into the light guide 19, the light guide device 19 possesses external reflection surfaces 37 for diverting the light.

Here the reflection surfaces 37 are arranged like steps and are offset with respect to one another in the main beam direction 43 of the LED 15. The external reflection surfaces 37 associated with the depicted light source 15 are likewise arranged in mirror symmetry with respect to the central plane 29.

For outputting the light input into the light guide device 19 or a part thereof the light guide device 19 possesses output means 39 (see FIG. 4a). The output means comprise a plurality of planar reflection surfaces 39 running parallel to one another which extend over the entire longitudinal extension of the light guide device 19. The planar reflection surfaces 39 form part of depressions constructed on the side of the light guide device 19 opposite the output surface 21, wherein this side is slightly inclined towards the main beam direction 43 of the LEDs 15, i.e. the light guide 19 is constructed to taper in the shape of a wedge so that reflection surfaces 39 located further away from the LEDs 15 can be supplied with light from the LEDs 15.

The incisions 25, 27 or the internal reflection surfaces 31, 33, 35 and the external reflection surfaces 37 each representing diverting means 25, 27, 31, 33, 35, 37 for diverting light directed into the light guide device 19 are each arranged between the light sources 15 and the output means 40 as best shown in FIG. 3b. The reflection surfaces 31, 33, 35, 37, 39 each form part of facets or facet-like depressions.

The mode of operation of the brake light 11 according to the invention is described below with additional reference to FIGS. 3b and 4b.

First of all light emitted by the light sources 15 in the main beam direction 43 of the light sources 15 is directed in the light guide direction 19. At the same time light emitted substantially in the main beam direction 43 of the light source 15 is diverted laterally by the front internal reflection surfaces 31 of the first incision 25 (see FIG. 3b). After this the light diverted laterally in this way is diverted back into the main beam direction 43 of the light source 15 by the rear internal reflection surfaces 35 of the incisions 27 so that the region of the light guide device 43 of the LEDs 15 adjoining the incisions 27 in the main beam direction 43 of the LEDs 15 concealed to a certain extent by the incisions 27 with regard to the light emitted by the LEDs 15 can be supplied with light.

Light emitted outside the main beam direction 43 of the light source 15 is also diverted laterally by the front internal reflection surfaces 33 of the incisions 27 in order then to arrive at the external reflection surfaces 37 of the light guide device 19 which in turn divert it in the main beam direction 43 of the light source 15.

The light guide 19 is consequently constructed in such a way that it brings about divergence and parallelisation of the light emitted by the light sources 15, wherein the light is homogeneously distributed over the entire width of the region 41. In doing so the divergence and parallelisation take place substantially in a plane. The beams of light in passing through the light guide device 19 are each diverted twice by the diverting means 25, 27, 31, 33, 35, 37. The width of the widened and parallelised light for each light source 15 amounts, for example, to 2 to 3 cm. As a general rule the width of the widening is adjustable via the geometry of the diverting means.

The light rendered divergent and parallelised is then output by the planar reflection surfaces 39 running parallel to the row formed by the light sources 15 from the light guide device 19 by the output surface 21 by which the brake light 11 fits against the rear window 13 (see FIG. 4b). The main beam direction 45 of the light put out with an aperture angle 47 is at the same time adjustable by changing the inclination of the planar reflection surfaces 39 with respect to the main beam direction 43 of the light rendered divergent and parallelised inside the light guide device 19 so that the brake light 11 according to the invention can be adapted to motor vehicles having different angles of slope of the rear window 13.

The vehicle light according to the invention has been explained with reference to a brake light illustrated in the drawing. According to the invention, however, the vehicle light may be any other vehicle light, in particular reversing light, braking light, fog light or flashing light.

The invention claimed is:

1. A vehicle light, in particular brake light, having at least one light source and a light guide device into which light emitted by the light source can be directed and which possesses output means for outputting the light or a portion of the light, wherein between the light source and the output means diverting means are provided in such a way that inside the light guide device widening and parallelization of the light takes place, and wherein the diverting means comprise at least one incision constructed on the light guide device which defines internal reflection surfaces for diverting the light laterally from a main beam direction of the at least one light source, and wherein an end face of the light guide device, has external reflection surfaces that form part of the diverting means and that divert light already diverted laterally previously in the main beam direction of the at least one light source;

wherein the incision extends all the way through the light guide device;

wherein a first incision arranged in the main beam direction of the light source possesses front internal reflection surfaces by means of which light emitted substantially in the main beam direction of the light source is laterally divertible; and wherein a second and third incision each arranged outside the main beam direction of the light source each have a front and/or rear internal reflection surface, wherein by means of the front internal reflection surfaces light whose beam direction is inclined at an angle differing from zero to the main beam direction of the light source is laterally divertible and/or due to the rear internal reflection surfaces light already diverted laterally previously is divertible in the main beam direction of the light source.

2. A vehicle light according to claim 1, wherein the light guide device has a plate-shaped basic form.

3. A vehicle light according to claim 1 wherein the diverting means are constructed for the multiple twofold diversion of the light.

4. A vehicle light according to claim 1, wherein for each light source said plurality of incisions are provided which are arranged with mirror symmetry with respect to a central plane.

5. A vehicle light according to claim 1 wherein the external reflection surfaces are arranged like a cascade or steps.

6. A vehicle light according to claim 5 wherein the external reflection surfaces each associated with a light source are arranged with mirror symmetry with respect to a central plane.

7. A vehicle light according to claim 1 wherein the diverting means are arranged in such away that the widening and parallelization of the light takes place substantially in a plane.

8. A vehicle light according to claim 1 wherein a plurality of light sources are arranged in a row running parallel to at least one reflection surface of the output means.

9. A vehicle light according to claim 1 wherein reflection surfaces for diverting the light are constructed as part of prisms or facets or prism-like or facet-like depressions.

10. A vehicle light according to claim 1 wherein the light guide device is simultaneously constructed as a housing part.

* * * * *